US010025844B2

(12) United States Patent
Hrle et al.

(10) Patent No.: US 10,025,844 B2
(45) Date of Patent: Jul. 17, 2018

(54) QUERY DISPATCHING SYSTEM AND METHOD

(71) Applicant: International Business Machines Corporation, Armonk, NY (US)

(72) Inventors: Namik Hrle, Boeblingen (DE); Andreas Lohrer, Oberviechtach (DE); Daniel Martin, Stuttgart (DE); Matthias Tschaffler, Nufringen (DE)

(73) Assignee: International Business Machines Corporation, Armonk, NY (US)

(*) Notice: Subject to any disclaimer, the term of this patent is extended or adjusted under 35 U.S.C. 154(b) by 321 days.

(21) Appl. No.: 14/856,664

(22) Filed: Sep. 17, 2015

(65) Prior Publication Data
US 2016/0171070 A1 Jun. 16, 2016

(30) Foreign Application Priority Data

Dec. 10, 2014 (GB) .................................. 1421916.6

(51) Int. Cl.
*G06F 17/30* (2006.01)
(52) U.S. Cl.
CPC .. *G06F 17/30578* (2013.01); *G06F 17/30339* (2013.01); *G06F 17/30377* (2013.01); *G06F 17/30383* (2013.01)
(58) Field of Classification Search
CPC ...................................................... G06F 17/30
See application file for complete search history.

(56) References Cited

U.S. PATENT DOCUMENTS 9,507,845 B1 * 11/2016 Natanzon .......... G06F 17/30581
2010/0318559 A1 * 12/2010 Yan .................... G06F 17/30545
707/769

(Continued)

FOREIGN PATENT DOCUMENTS

WO 2008140937 A2 11/2008
WO 2013114198 A1 8/2013

OTHER PUBLICATIONS

Pending Application No. 1421916.6 (GB), filed on Dec. 10, 2014, titled "Query Dispatching System and Method," pp. 1-49.

(Continued)

*Primary Examiner* — Khanh B Pham
(74) *Attorney, Agent, or Firm* — David Zwick

(57) ABSTRACT

A computer receives a database request to be executed on a source database or a target database. The source database is configured to efficiently process database queries of a first query type, the target database is configured to efficiently process database queries of a second query type, data changes in the source database are asynchronously replicated to the target database, and all changed data in the source database impacting a result of the database request are replicated to the target database before executing the database request. The computer determines a latency time to asynchronously complete a replication of unreplicated data changes and determines a velocity of replication. The computer predicts, using the latency time and velocity of replication, which of the databases will complete an execution of the database request first and dispatches the database request to the database predicted to complete the execution of the database request first.

18 Claims, 3 Drawing Sheets

(56) References Cited

U.S. PATENT DOCUMENTS

2013/0198368 A1    8/2013  Patterson et al.
2013/0343747 A1*  12/2013  Sarwar ............... H04L 43/0852
                                                    398/25
2014/0279897 A1*   9/2014  Bourbonnais ..... G06F 17/30575
                                                    707/634

OTHER PUBLICATIONS

Search Report (GB), Application Number: GB1421916.6, Date of Search: Jun. 3, 2015, pp. 1-3.
Bodorik et al., "Distributed Query Processing Optimization Objectives," Data Engineering, 1988, Proceedings, Fourth International Conference, Conference Date: Feb. 1-5, 1998, Los Angeles, CA, IEEE, pp. 320-329.

* cited by examiner

QUERY DISPATCHING SYSTEM AND METHOD

BACKGROUND

The present disclosure relates generally to computing systems, and more particularly to operating databases and dispatching queries.

Databases are used to store information for an innumerable number of applications and use case scenarios. Various types of database management systems (DBMSs) exist and various different database schemas are used, respectively, to optimize for performing some particular kinds of database queries efficiently. Said special-purpose databases may be structured as to allow efficient processing of database queries of a first type but may be slow when processing database queries of another type because of the table structure and indices of the database, or because the internal query optimization logic of the corresponding DBMS is not optimized for said other kind of queries. For example, an online analytical processing (OLAP) database may process OLAP queries efficiently, but not OLTP queries. An online transactional processing (OLTP) database may process OLTP queries efficiently, but not OLAP queries.

Some existing approaches (based e.g. on hybrid DBMSs) try to overcome said difficulties by storing the data redundantly in two different copies of the data to be queried. Each copy being stored in a database that is optimized for efficiently performing a particular kind of database query. Data changes applied in one of said copies is replicated to the other copy to ensure that a query returns the same result, irrespective of whether the query is performed on the original database or on the copy.

A problem of using a combination of two or more databases optimized for different query types which are synchronized by a replication process is that the decision to which database a particular query is dispatched is often inflexible and/or not optimal in terms of performance.

SUMMARY

Embodiments of the present invention disclose a method, computer program product, and system for dispatching a database request to either a source database or a target database wherein the source database is configured to efficiently process database queries of a first query type, the target database is configured to efficiently process database queries of a second query type, wherein data changes in the source database are asynchronously replicated to the target database, and wherein all changed data in the source database impacting a result of the database request are replicated to the target database before executing the database request. A computer receives a database request to be executed on a source database or a target database, determines a latency time to asynchronously complete a replication from the source database to the target database of, at least, all unreplicated data changes that impact the result of the received database request and determines a velocity of replication to the target database. The velocity of replication is one of: a capture velocity, the capture velocity being a number or size of data changes applied to the source database that can be identified in a predefined time interval; an apply velocity, the apply velocity being a number or size of identified data changes that can be applied to the target database in a predefined time interval; a function of the capture velocity; a function of the apply velocity; or a function of both the capture and the apply velocity. The computer then predicts, using the determined latency time and determined velocity of replication, which of the source database or the target database will complete an execution of the received database request first, wherein a high latency time and a low velocity lowers a probability that the execution of the received database request will be finished first on the target database. Responsive to predicting which of the source database or the target database will complete the execution of the database request first, the computer dispatches, the database request to the source database or the target database predicted to complete the execution of the database request first.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
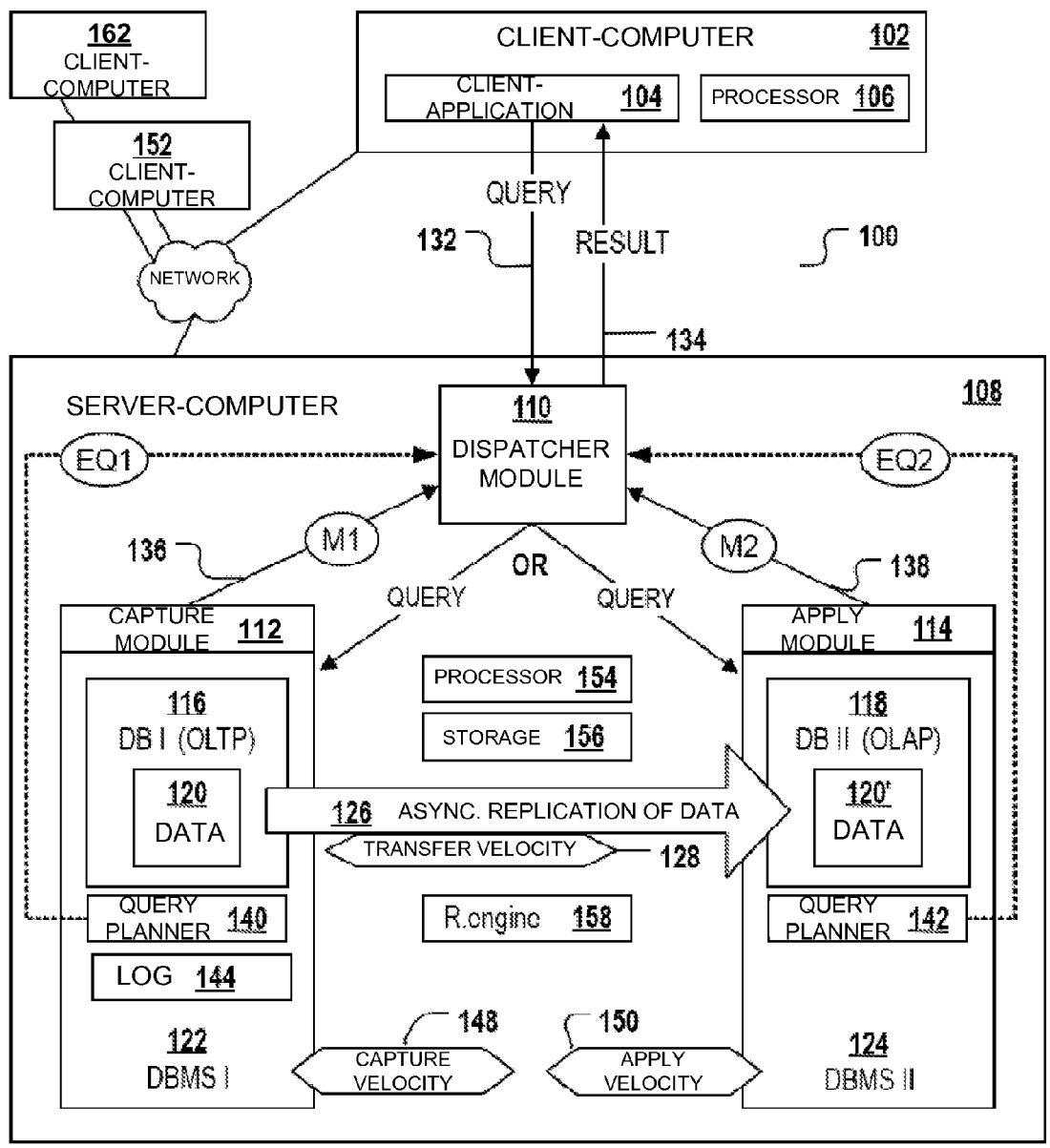
FIG. 1 illustrates an exemplary system for managing databases and dispatching queries, in accordance with an embodiment of the present disclosure.

In the following, like numbered elements in the figures either designate similar elements or designate elements that perform an equivalent function. Elements which have been discussed previously will not necessarily be discussed in later figures if the function is equivalent.

A "database" as used herein is a collection of electronic information that is organized in memory or on a non-volatile storage volume in the form of a particular, defined data structure which supports or is optimized for data retrieval by a particular type of database query.

A database may be organized in tables or columns or other forms of data structures to provide efficient retrieval. An individual table may act as database. In conventional databases, all tables of the database have the same structure in respect to the physical organization of the data in the memory or on a non-volatile storage medium. For example, some row-oriented databases may include multiple tables which organize their data in a row-oriented manner. Some column-oriented databases may solely include tables which organize their data in a column-oriented manner. In said cases, the database and all its tables may structurally be optimized for a particular type of database query.

There also exist some DBMSs (database management systems) where a DBMS stores data redundantly in different data structures that support different kinds of database queries. Such a DBMS, when storing some data in a row-oriented manner, may automatically create a copy of said data and store the copy in a column-oriented manner. The DBMS may hide the two different data structures, including the two data copies, and be optimized for different kinds of database queries from the user. The DBMS may "present" only a single "virtual table" to which database queries may be directed, and may automatically dispatch the database queries to the one of the two data structures which is optimized for processing said kind of query. Although said kind of DBMS presents only a single "virtual table" to the user or client application programs, in fact said DBMS includes two different database tables whose structures are optimized for different kinds of database queries. Said two different kinds of database tables (e.g. a data container organized in row-major order and a data container organized in column-major order), although represented by a single "virtual table", will in the following be considered as two databases optimized for different kinds of database queries which may respectively act as source database or as target database. Thus, according to the above definition, a "virtual database table" that dispatches database queries to one of a plurality of different data structures optimized respectively for different kinds of database queries is thus, according to the above definition, not a 'database' in the sense of the invention. Rather, each of said plurality of different data structures would respectively resemble a "database" as used herein. The expression that a first database is "configured for efficiently processing database queries of a first query type" while a second database is "configured for efficiently processing database queries of a second query type" may mean that the two databases may have stored the same data but may have stored the data in different data structures. Even if the first and second database store the same data and all environmental parameters, for example CPU load, memory capacity, etc., of the first and the second database are identical, a requested statement may be executed faster on one of the databases than on the other database. The performance of the requested statement may depend on the type of the requested statement (e.g. SELECT type or INSERT type, or the order of multiple JOIN clauses within the query).

A "database management system" (DBMS) is a software and/or hardware based system that is designed to allow the definition, creation, querying, updating and administration of one or more databases. Typically, a DBMS is operable to interact with a user, with other applications, and one or more databases managed by the DBMS to process some requests and to analyze data. Well-known DBMSs include MySQL, MariaDB, PostgreSQL, SQLite, Microsoft SQL Server, Microsoft Access, Oracle, SAP HANA, dBASE, FoxPro, IBM DB2, and others.

The term "statement" is a data processing command. According to preferred embodiments, a statement is a Structured Query Language (SQL) statement, which performs a write operation (INSERT, UPDATE or DELETE) in a database or a read operation (SELECT) to read data from the database. A "statement" or "query" may have a particular "query type". According to some embodiments, a statement may be specified according to the syntax requirements of a database that does not support SQL as query language or that accepts queries and statements in a different syntax and then maps such queries and statements to SQL syntax internally.

A "transaction" or "database transaction" is a logical unit of database operations which are executed as a whole to process user requests for retrieving data. A transaction is a larger unit that includes and frames one or more statements. A transaction ensures that the action of the framed statements is atomic with respect to recovery.

The term "log" as used herein refers to a data structure acting as a container for information on all statements and transactions having been performed on a particular database. A 'log' may be implemented as electronic document, e.g. a text file, a binary file or a set of database records. A single physical data structure (file, set of database records, etc.) may include the logs of multiple databases.

The term "synchronization" of two databases as used herein implies that a particular request will return an identical result irrespective of which of the two databases is used for processing the request.

Figure 3:
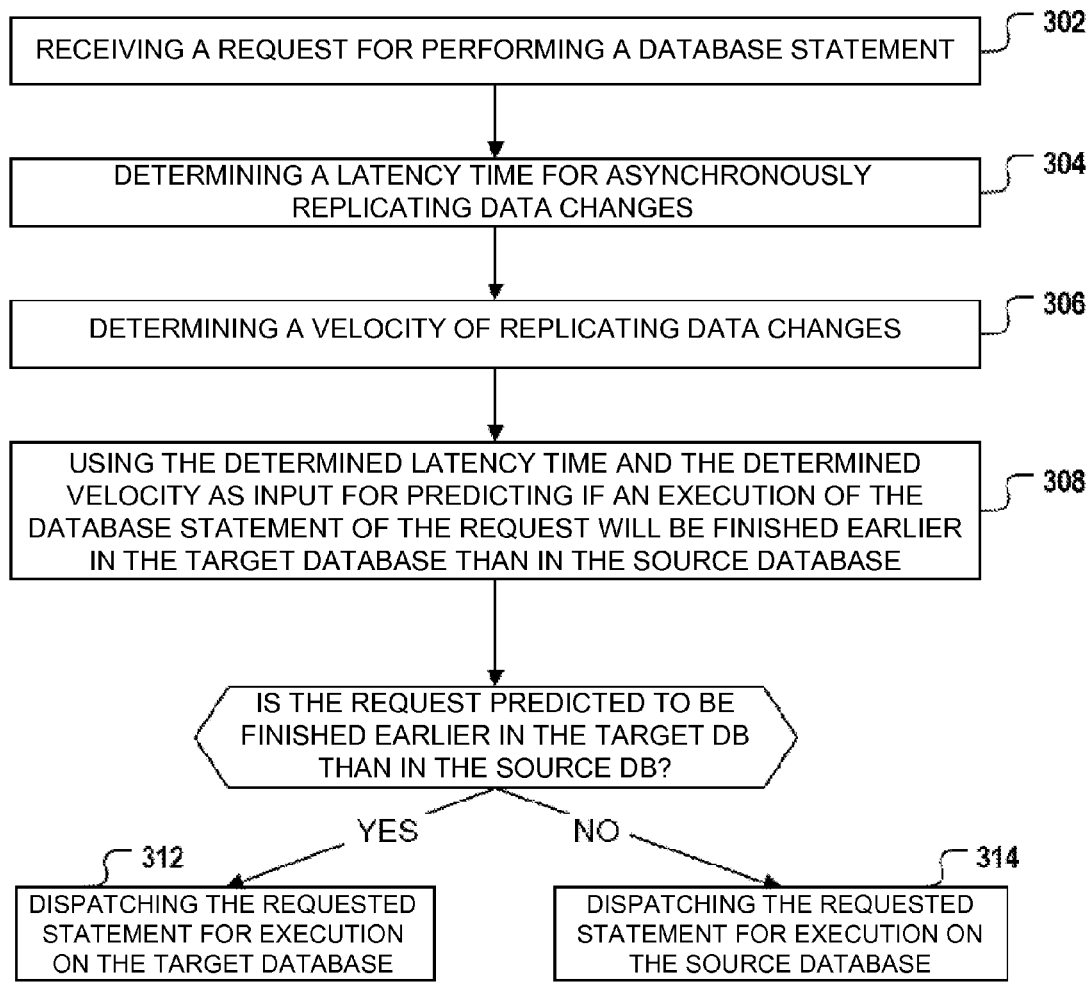
FIG. 3 is a flowchart for dispatching database queries, in accordance with an embodiment of the present disclosure.

FIG. 1 illustrates an exemplary system for managing databases and dispatching queries, in accordance with an embodiment of the present disclosure. The system depicted in FIG. 1, will be described in the following by making reference to a method of dispatching queries as depicted in FIG. 3.

FIG. 1 shows an embodiment of a system 100 for managing databases and for dispatching queries. The system includes a source database 116 and a target database 118. The source database may be configured for efficiently processing database queries of a first query type, e.g. OLTP queries. The target database is configured for efficiently processing database queries of a second query type, e.g. OLAP queries. Other types of specially optimized databases may also be used and combined as source and target databases. Examples are graph databases being optimized for the storage and retrieval of data organized as a graph, triplestores optimized for the storage and retrieval of subject-predicate-object triples, key-value pair based databases for efficiently handling unplanned, ad hoc queries; document stores, row-oriented databases, column-oriented databases or individual tables organized in row major order or column major order.

The system includes a replication engine 158 configured to asynchronously replicate data changes of data 120 in the source database to the target database. As a result, the target database is filled with a copy 120' of the data 120 of the source database. Hereinafter, a latency time specifies the total time needed to asynchronously and completely replicate, at least all unreplicated data changes that have an impact on the result of the statement, from the source database to the target database. The latency time, as used in some embodiments of the invention, is described in further detail with respect to FIG. 2. The system 100 further includes a dispatcher module 110. The dispatcher module 110 may be a software, hardware, and/or a firmware based module for deciding to which database a particular query should be dispatched for execution. The exemplary system 100 is configured as follows:

The dispatcher module 110 receives a request 132 for performing a statement, e.g. a database statement. Any data changes applied in the source database on the requested data must be processed before executing the request. This means that the system must ensure that the request will return identical results, irrespective of whether it is executed on the source or the target database. All unreplicated changes existing in the source database, at the moment of receiving the request, have to be successfully replicated to the target database before the query is allowed to execute on the target database. The dispatcher module 110 determines the latency time for the asynchronous replication of at least the unreplicated data changes of the source database that are of relevance for the statement in the query. The data changes being of relevance for the statement of the query include at least all unreplicated data changes that have an impact on the result of the statement. According to some embodiments, said data changes include all unreplicated data changes having been performed on any one of the columns of tables of the source database which are to be accessed by said statement. According to other embodiments, said data changes include all unreplicated data changes having been performed on any one of the tables of the source database which are to be accessed by said statement. According to still other embodiments, said data changes include all unreplicated data changes having been performed on any one of the tables of the source database.

For example, the determination of the latency time may be performed by applying some heuristics on history data. Depending on the embodiment, the historic data of individual columns, of individual database tables or of individual tables of the source database may be evaluated for determining and predicting the latency time required for replicating at least all data changes relevant for the statement of the request to the target database. For example, the dispatcher module 110 may continuously, e.g. every hour or once in a day, receive some monitoring data M1, M2 from the source and the target database 116, 118. The monitoring data may include capture times 204 (FIG. 2), transfer times 206 (FIG. 2), and apply times 208 (FIG. 2) observed for previous data replication operations. For example, if the historic data indicates that the latency time L resulting from said three time values for 100 Megabytes (Mb) was 30 seconds at night and during weekends, but 60 seconds during normal working days, the dispatcher module 110 may determine, in dependence, e.g. on the current time and day of the week, if the latency time is 30 seconds or 60 seconds. Other, more complex heuristics may likewise be used, e.g. a prediction of the latency time based on historic data taking also into consideration the kind of data to be replicated (backup data or operative data), the type or status of the replication engine 158, currently observed hardware dependent factors F1, F2, F3 (described in further detail in FIG. 2), etc. The current hardware dependent factors F1, F2, F3 (FIG. 2) may be determined automatically after having received the request. According to embodiments, the dispatcher module 110 may regularly receive a current capture velocity value from a source DBMS 122 operating the source database, and receive a current apply velocity from a target DBMS 124 operating the target database. In combination with an estimated amount of data changes having accumulated since the previous replication, and with a predefined or dynamically estimated transfer time 206 (FIG. 2), said current velocity values may be used for predicting a current latency time L 202 (FIG. 2) that is needed, given the current system load and status parameters such as the current velocities 148, 128 and 150, to replicate the data to allow a query to be executed on the target database and return the same result as when executed on the source database.

In various embodiments, the dispatcher module 110 also determines a velocity of the replication, wherein the velocity is a capture velocity 148 or an apply velocity 150 or a derivative of the capture and/or the apply velocity. The dispatcher module 110 may use the determined latency time and the determined velocity of replication as input for predicting if an execution of the statement of the request 132 will be finished earlier in the target database than in the source database. The higher the latency time and the lower the velocity of replication, the lower the probability that the request will be finished earlier in the target database. If the request is predicted to be finished earlier in the target database, the dispatcher module 110 dispatches the requested statement for execution on the target database. If not, the dispatcher module 110 dispatches the requested statement for execution on the source database.

Using a latency time in combination with a velocity for deciding if the query should be dispatched to and executed at the source database or the target database may be more flexible than dispatching approaches which merely evaluate the type of query and then strictly dispatch the query depending on its type. By taking a velocity and a latency time into consideration, physical parameters of the IT infrastructure of the source and/or of the target database and of the replication process are also taken into account. Thus, dispatching may react to the varying load and performance characteristics of the IT infrastructure resources involved in the replication process. For example, in cases where the velocity is very low (e.g. due to a target DBMS server being occupied to its capacity by other processes), a query may be executed on the source database even though the query may be of a type that is normally executed faster on the target database. Thus, the overall performance of query execution may be increased.

A combination of the velocity and of the latency time is beneficial because the availability of different IT resources is considered when said two values are input for the prediction. The velocity may, for example, depend on the speed and capacity of the CPU, storage, and memory of the computer hosting the source database and/or of the computer hosting the target database, as said resources are responsible for capturing and/or applying the changes to be replicated. The latency time to transfer the data change depends, e.g. on a network connection to the source database. Thus, the factors relevant to transfer time may be completely different than factors relevant to the capture or apply velocities. By taking into account the latency time which includes and correlates with the transfer time, several different hardware-related features of the underlying IT infrastructure have an impact on the dispatching decision. Thus, the decision may lead to better and more accurate results in terms of identifying the database where a particular query, given the current physical state of the IT infrastructure, will finish earlier. Using the latency time may be advantageous, as the latency time may be more easily identifiable than the transfer time because the identification of the transfer time requires the identification of the moment at which a capture process ends and the apply process begins.

The capture process may be performed by a capture module 112 which may repeatedly and automatically determine the current capture velocity 148 and forward 136 the determined capture velocity M1 to the dispatcher module 110. Alternatively, a current capture velocity 148 may be determined and returned by the capture module 112 in response to a request by the dispatcher module 110, the request of the dispatcher module 110 being triggered by receiving a query 132 from a client application 104 executing on a processor 106 of a client computer 102. The client computer 102 may be one of a plurality of client computers 152, 162 connected via a network to the system 100.

The apply process may be performed by an apply module 114 which may repeatedly and automatically determine the current apply velocity 150 and forward 138 the determined apply velocity M2 to the dispatcher module 110. Alternatively, a current apply velocity 150 may be determined and returned by the apply module 114 in response to a request by the dispatcher module 110 as described above for the capture process.

In FIG. 1, the source and the target database may be hosted on the same server 108. However, in many other scenarios, the source database and each of the one or more target databases may be hosted on a respective database server, the servers being connected to each other via a network. The dispatcher module 110 may be hosted on a separate further server or on one of the servers hosting one of said source or target databases.

A computer-readable storage medium 156, which may belong to the system 100, may include machine executable instructions for execution by one or more processors 154. The execution of the instructions causes the one or more processors 154 to execute the database management and query dispatching method of any one of the embodiments described herein.

Referring now to FIG. 3, with continuing reference to FIG. 1. FIG. 3 is a flowchart for dispatching database queries, in accordance with an embodiment of the present disclosure. At 302, the dispatcher module 110 receives a request 132 for performing a statement. All data changes having been applied in the source database on requested data must be processed before executing the request. At 304 and 306, the dispatcher module 110 determines the latency time and a velocity. The velocity may be a capture velocity 148, an apply velocity 150, or a derivative of the capture and/or the apply velocity. As described above, the velocity may be determined by the dispatcher module 110 by applying heuristics on historical data and statistics. The velocity may also be received from the capture module 112 and/or the apply module 114 which may each monitor and provide the historical or statistical data, or may even provide a current estimated value for the capture or apply velocity 148, 150. At 308, the dispatcher module 110 uses the determined latency time and the determined velocity 148, 150 as input for predicting if an execution of the statement of the request will be finished earlier in the target database than in the source database. Preferentially, the determined latency time and velocity have been determined dynamically in response to the receiving of the query 132 in dependence on currently observed, hardware dependent factors F1, F2, F3 described below with reference to FIG. 2, and/or in dependence on historical and statistical data. The higher the latency time and the lower the velocity, the lower the probability that the request will be finished earlier on the target database. If the request is predicted to be finished earlier in the target database, the dispatcher module 110 dispatches, at 312, the requested statement for execution on the target database. If not, the dispatcher module 110 dispatches, at 314, the requested statement for execution on the source database.

According to embodiments, determining the velocity includes calculating the velocity according to the following formula:

$$Vtotal=(minimum(Vcapture,Vapply))*C1+C2$$

Vcapture, the capture velocity, is indicative of the number or size of data changes in the source database that can be captured and scheduled for replication in a given time interval.

Vapply, the apply velocity, is indicative of the number or size of data changes that can be applied on the target database in a given time interval.

Vtotal is the velocity determined by the dispatcher module 110.

C1 is a constant number, e.g. "1", "1.4", "3", etc.
C2 is a constant number, e.g. "0", "0.1", "0.4", etc.
Typically, C1 is "1" and C2 is "0". However, said values may be modified by a user, e.g. in a configuration, if the user should want to slightly modify or correct the automated calculation for the minimum value minimum(Vcapture,Vapply), e.g. to ensure that the calculation returns a result that includes a safety margin, or to take into consideration additional hardware resources that contribute to the capture or apply speed but for which performance data cannot be automatically derived by the capture or apply modules 112, 114, nor by the dispatcher module 110.

Said calculation of the velocity of the replication process may be advantageous, because the resulting velocity value returned is identical to the "bottleneck" velocity value. Even if the apply module 114 predicts that current data changes can be applied with a speed of 100 Mb per second, the velocity returned as a derivative of the apply and the capture velocity may only be 5 Mb per second if the capture module 112 determines the current capture velocity is only 5 Mb per second. Even if the capture module 112 predicts that current data changes can be captured with a speed of 400 Mb per second, the velocity returned as a derivative of the apply and the capture velocity may be only 20 Mb per second if the apply module 114 determines the current apply velocity is only 20 Mb per second. Thus, instead of considering only one of the two velocity values, or calculating an average, a minimum value is calculated for computing a derivative "velocity" from both the capture and the apply velocity.

In various embodiments, the dispatcher module 110 receives a first estimated duration EQ1 from a first query planner 140 assigned to the source database 116, the first estimate duration EQ1 being indicative of an estimated time required for performing the requested statement on the source database 116. The first estimated duration EQ1 may depend, for example, on query-related features, e.g. the type of the requested statement, e.g. if the requested statement is of an OLTP type or an OLAP type. The dispatcher module 110 also receives a second estimated duration EQ2 from a second query planner 142 assigned to the target database 118, the second estimate duration EQ2 being indicative of an estimated time required for performing the requested statement on the target database 118. The second estimated duration EQ2 may depend, for example, on query-related features, e.g. on the type of the requested statement. The dispatcher module 110 then uses the received first and second estimated durations EQ1, EQ2 as further input for performing the prediction. The longer the received first estimated duration EQ1 and the shorter the received second estimated duration EQ2, the higher the probability that the execution of the request statement is predicted to be finished earlier in the target database 118 than in the source database 116. Said features may be advantageous, because the prediction of which of the available databases will be the first one to return a result for a particular query is particularly accurate. By combining the results of two query planners 140, 142, which may be query planners of two separate DBMSs, the duration of query execution on each of the source and the target database can be predicted and query-related features such as the query type may have an impact on the result. For example, OLAP type queries may be predicted to be executed in a shorter period of time on the target database if the target database is an OLAP type database and the source database is an OLTP database. In addition, hardware related factors F1, F2 and/or F3 (FIG. 2) may also be considered by the dispatcher module 110 by taking into consideration the velocity and the latency time. As a result, the query might not be dispatched to the target database 118, even in cases where the query execution time itself is shorter in the target database, if it is predicted that the latency time L would outweigh the increased execution time.

According to some embodiments, the first and the second query planners 140, 142 are identical and/or the source and the target DBMSs 122, 124 are identical. For example, this may be the case if the same DBMS manages both the source and the target database.

Some embodiments may determine the transfer velocity 128 of the asynchronous replication process 126 and use the determined transfer velocity 128 as further input for the prediction. The higher the transfer velocity 128, the higher the probability that the dispatcher module 110 will dispatch a query to the target database 118. In some embodiments, the transfer velocity 128 and/or an estimated transfer time 206 (FIG. 2) may be determinable by simply using the total latency time 202 which includes and correlates with the transfer time 206.

According to embodiments, performing the prediction includes determining a transfer velocity 128. The transfer velocity 128 being indicative of the number or size of captured data changes of the source database 116 that can be transferred to the target database 118 in a predefined time interval during the asynchronous replication 126. Said determination may be computed by executing a heuristics on historical data that may be, for example, monitored and stored by the replication engine 158. Monitoring and storing data transfer velocity data may be performed automatically on a regular basis, and a current transfer velocity value or historical data, from which the transfer velocity 128 can be computed, may be returned to the dispatcher module 110 regularly or upon a request by the dispatcher module 110. Performing the prediction also includes calculating a combined target duration according to the formula:

$$CTD = EQ2 + \left(L * \frac{VT}{V} * C3\right) + CF$$

L is the determined latency time.
VT is the determined transfer velocity.
V is the determined velocity, e.g. the capture velocity 148, the apply velocity 150, or a minimum value of the capture and the apply velocity 148, 150.
C3 is a constant number, preferably "1".
CTD is the combined target duration. The combined target duration is indicative of a total duration predicted to be necessary for replicating all unreplicated data changes and completely performing the execution of the requested query on the target database 118, starting from the current system time at the moment the request is received. The time interval between receiving the request and completing the execution of the requested statement on the target database 118 includes the time for replicating the data changes, thus, the predicted combined target duration may be a sum of the predicted replication time and the estimated query execution time on the target database 118. CF is a constant indicating hardware, software, and/or firmware-related delays, the delays occurring when performing the requested query on the target database 118, said delays being invariable over time. CF may be, for example, "0". Similar to parameters C1 and C2, the parameters "C3" and "CF" may be user-configurable for slightly modifying and correcting the calculation of the CTD value for different hardware infrastructures. CF may represent fixed delays, such as delays caused by the process of establishing a network connection between the source and the target database.
EQ2 is indicative of an estimated time required for performing the requested statement on the target database 118.

The execution of the statement of the request is predicted to be finished earlier in the target database 118 than in the source database 116 when the calculated combined target duration is shorter than a predicted time for immediately executing the requested statement on the source database 116. For example, said predicted time for immediately executing the requested statement on the source database 116 may be received as the first estimated duration EQ1 from the first query planner 140.

Said features may provide for a dispatching strategy that is highly dynamic and may accelerate query execution by accurately determining which database is capable of being the first to return the requested result, by taking into account the current hardware characteristics as well as the structural particularities of the query and the available databases. The dispatcher module 110 may act as a "super optimizer" or "super query planner", taking into account the predicted query execution times of two or more DBMSs and respective query planners. According to embodiments, the prediction of the first and second estimated times EQ1 and EQ2 may include evaluating database catalog lookups, checking for database statistics, data types of the database columns to be accessed, query planning (join order, "predicate push-down"), and/or a current workload of the database for performing queries having already been dispatched to said database.

According to embodiments, the first estimated duration EQ1 and the second estimated duration EQ2 may be normalized in order to make the first and second estimated durations comparable. This may allow using DBMSs with corresponding query planners 140, 142 provided by different vendors, such as IBM, SAP, Oracle and others to be compared. The normalization may be performed, for example, by the dispatcher module 110 and may allow for an improved query dispatching even in a heterogeneous IT environment.

According to embodiments, one or more of the following operations are executed in response to receiving the request:
   determining the latency time
   determining the velocity, including the capture velocity 148 and/or the apply velocity 150
   determining a transfer velocity 128, the transfer velocity 128 being indicative of the number or size of captured data changes on the source database 116 that can be transferred to the target database 118 in a predefined time interval during the asynchronous replication 126
   requesting, by the dispatcher module 110, the first estimated duration EQ1 from the first query planner 140
   requesting, by the dispatcher module 110, the second estimated duration EQ2 from the second query planner 142
   predicting if an execution of the statement of the request will be finished earlier in the target database 118 than in the source database 116.

This may be advantageous, as the latency and velocity may vary over time. By determining said values dynamically, in response to receiving the request 132, the prediction result will be more accurate.

According to embodiments, all unreplicated data changes having been applied on the source database 116 on requested data, before the receiving of the request, are identified by identifying all data changes having been applied in the source database 116 before a particular moment in time. Said moment may be the commit event of the most recently committed transaction having committed in the source database 116. According to said embodiments, the query performed on the target database 118 will not "see" data changes imposed by preceding write statements of the same query".

Alternatively, said moment may be the moment when a particular write statement introduced the data changes in the source database 116 by performing an UPDATE and/or DELETE database operation. Said particular write statement and the requested statement belong to a requested transaction that has not yet committed when the dispatcher module 110 receives the request. The particular write statement may directly precede the requested statement in the requested transaction. In this context, said uncommitted data changes may also have to be replicated to the target database 118 before the query is allowed to be executed there. Various embodiments may asynchronously replicate the identified unreplicated data changes to the target database 118.

According to embodiments, the first query planner 140 has a first clock, the second query planner 142 has a second clock and the dispatcher module 110 has a third clock. Various embodiments may synchronize the first, second, and third clocks, making one or more of the latency time, the velocity, the first estimated duration EQ1, and the second estimated duration EQ2 values comparable. For example, if the capture velocity value is determined in number of statements per minute and the apply velocity value is determined in Mb per second, at least one of said two figures needs to be normalized, e.g. transformed to another unit, in order to make the capture and apply velocity comparable, e.g. for determining the velocity as the minimum of said two velocities.

According to embodiments, the target database 118 is one of a plurality of target databases (not shown). Each of said plurality of target databases is associated with a respective second query planner. In some embodiments, each target database and a DBMS operating said target database is hosted by a respective database server connected to a server hosting the source database via a network. In this embodiment:

in response to receiving the request, sending, by the dispatcher module 110, a duration request to each of the plurality of second query planners receiving, by the dispatcher module 110 in response to the duration requests, from each of two or more of the second query planners: the latency time for the asynchronous replication of the unreplicated data changes to said target database; a velocity, the velocity having been determined for the one of the target databases associated with said second query planner, wherein said velocity is a capture velocity or an apply velocity of said target database or a derivative of said capture and/or said apply velocity, the apply velocity having been determined by said second query planner for the target database associated to said second query planner; and an estimated second duration EQ2 being indicative of an estimated time required for performing the requested statement on the target database associated with said second query planner calculating, by the dispatcher module 110, the combined target duration CTD for any one of said two or more target databases. Said calculation may be executed, for example, according to embodiments configured to calculate the CTD as described above. According to some embodiments, the combined target duration CTD is calculated for only a fraction of all possible pairs of source database and target database. For example, the calculation may be aborted once the dispatcher module has calculated the CTD for a threshold number of target databases, e.g. 50% of the available target databases. For example, said threshold number of target databases may be that fraction of target databases from which the dispatcher module 110 received the relevant latency time and velocity values first, e.g. the 50% of the target systems having responded earliest to a request of the dispatcher comparing, by the dispatcher module 110, the calculated combined target durations CTD with each other and with the first estimated duration of performing the requested statement on the source database automatically dispatching, by the dispatcher module 110, the requested statement for execution on the one of the target databases having the shortest one of the combined target durations CTD, if said shortest combined target duration CTD is shorter than the first estimated duration EQ1 received from the first query planner.

According to embodiments, a target DBMS in control of the target database 118 is configured to automatically increase a version number assigned to the target database 118 upon any structural change of the target database that potentially affects the execution time of a query on the target database 118. Such structural change can be, for example, the adding or dropping of an index to or from a database table, the adding or dropping of a database schema, etc. In this embodiment, the second query planner 142 identifies a version number of the target database 118; calculates the second estimated duration EQ2 for the target DBMS having assigned the identified version number; returns the calculated second estimated duration and the identified version number to the dispatcher module 110, e.g. in response to receiving a duration request. The dispatcher module then dispatches the requested statement for execution in association with the version number to the target database 118 where the target DBMS compares, before executing the dispatched statement on the target database, the version number associated with the dispatched statement with the version number currently assigned to said target database. If the compared version numbers are identical, the target DBMS performs the dispatched statement on the target database 118. If the compared version numbers are not identical, the target DBMS does not perform the dispatched statement. According to some embodiments, the second query planner may, in this case, recalculate the second estimated duration EQ2 for the new version number and return it to the dispatcher module 110 in combination with the new version number.

Said features may ensure that poor performance of a query on a database, caused by a modification of the structure in said database, is automatically avoided and an automated update mechanism is provided for keeping the prediction of query execution time up-to-date with the structure of the underlying databases.

According to embodiments, a materialized query table ("MQT") of a database is used as the target database 118. A materialized query table is a table whose definition includes one or more database queries and whose data content is retrieved as a result of executing said one or more database queries, therefore said data content includes pre-computed results that are derived from one or more tables accessed upon execution of said one or more database queries. The definition of a materialized query table may include joins, functions, and/or other SQL elements. One or more other database tables in the same database as the materialized query table that act as the data source for the materialized query table can be used as the source database 116.

Various embodiment determine the latency time for the target database 118 by determining the expected time between the beginning of a first refresh of the materialized query table and the end of a succeeding, second refresh of the materialized query table. A "refresh" being the execution of the one or more database queries included in the definition for populating the materialized query table with data having been currently derived by said executed query.

The determining of the velocity v for the materialized query table, in this particular embodiment, is identical to determining the apply velocity and the capture velocity. The velocity v is determined by dividing the size of the data content of the materialized query table (e.g. the number of records or Bytes) by the time required for performing the one or more database queries on the one or more database tables to extract the data from those one or more database tables, and the time required for loading the extracted data into the memory structures that represent the MQT.

According to some embodiments where the MQT is used as the target database 118, the transfer time 206 (FIG. 2) is the time needed to transfer data that has successfully been extracted from the source database 116, i.e. from the one or more accessed database tables, to the memory structures that represent the MQT. This can be influenced, for example, by disk and/or CPU capacity.

The transfer velocity VT is the amount of data retrieved by said one or more database queries and that is transferred from the source database, i.e. from the one or more tables accessed by the one or more queries, into the memory structures that represent the MQT. The latency time L, in this case, may be the total time needed to perform the one or more database queries included in the definition of the MQT on the one or more tables, to transfer the results of said query execution to the memory structures that represent the MQT, and to store the transferred data into said memory structures. In other words, the latency time L is the time between two retrieval events, that is, from the beginning of the first refresh operation to the end of the second refresh operation.

According to some embodiments where the MQT is used as the target database 118, the estimated query time EQ2 for performing a query on the target database 118 is the time required to perform the requested statement on the MQT (acting as the target database). The estimated query time EQ1 for performing a query on the source database 116 is the time required to perform the requested statement on the one or more database tables which are accessed by the one or more database queries included in the specification of the MQT (acting as the source database). The fixed costs CF in this case are usually equal or near to "0".

Using MQTs as target databases 118 may significantly improve the performance of query execution. An MQT can replace repeating calculations, or can be used to avoid table or index scans. Replicated MQTs can reduce the data partitioning broadcast of tables that are not collocated. Summary tables implemented as MQTs are usually much smaller than the base (fact) tables. This may reduce memory consumption and reduce the time necessary for loading the relevant data into memory. Currently MQTs are preferred over real tables mostly for performance reasons (better access path is chosen) per default. In cases where MQT data is outdated, the MQT needs to be refreshed before the query can actually be performed on the MQT. Similar to the other use cases, selecting the data source to be accessed, based on the comparison of the EQ1 and EQ2 as specified, may enable the dispatcher module 110 to route the query to the MQT or to the original database tables more precisely, understanding the latency time and the combined target duration (which implicitly does consider the "refresh age".

According to embodiments, capturing the data changes in the source databases 116 is performed asynchronously to performing transactional database queries on the source database 116. Applying the captured and replicated data changes on the target database 118 is performed asynchronously to a data transfer process, the data transfer process transferring the captured, unreplicated data changes from the source database 116 to the target database 118 for asynchronous replication.

According to embodiments, capturing the data changes includes evaluating a transaction log 144 of the source database 116 for extracting statements that introduced the unreplicated data changes that need to be replicated. Applying the captured and replicated data changes on the target database 118 includes performing all the extracted data changes on the target database 118.

Figure 2:
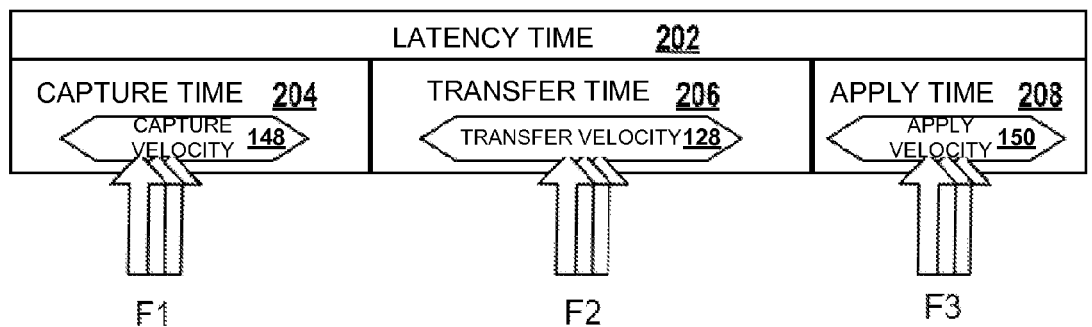
FIG. 2 is a block diagram of latency time and its components, in accordance with an embodiment of the present disclosure.

Referring now to FIG. 2, a block diagram of the latency time 202 and its components, in accordance with an embodiment of the present disclosure. The latency time 202 includes a capture time 204, a transfer time 206, and an apply time 208 according to the formula:

$$L = \text{capture\_time} + \text{transfer\_time} + \text{apply\_time}$$

L is the latency time 202. The capture time 204 depends on the capture velocity 148, which may depend on various factors F1. The transfer time 206 depends on the transfer velocity 128, which may depend on various factors F2. The apply time 208 depends on the apply velocity 150, which may depend on various factors F3. The latency time L is the sum of the capture time, the transfer time and the apply time.

The capture_time is the time necessary for capturing, i.e., identifying and extracting, all unreplicated data changes existing in the source database 116 at a particular moment in time, e.g. at the time of receiving a database query. In some embodiments, the capture_time is the time necessary for capturing, i.e., identifying and extracting, only those unreplicated data changes existing in the source database 116 at a particular moment in time which are of relevance for said query, e.g. because the data changes are stored in tables which are accessed when executing said query.

The transfer_time is the time necessary for transferring the captured data changes from the source database to the target database. The transfer may be performed via a system bus of a computer system or via a network, e.g. the internet or an intranet connecting two different computers respectively hosting the source database 116 or the target database 118.

The apply_time is the time necessary for applying the transferred data changes on the target database 118. For example, the apply_time can be the time necessary to perform one or more INSERT, UPDATE or DELETE statements on the target database 118 for applying the transferred changes. The apply process may be performed, for example, statement by statement or in a batch mode.

The capture velocity 148 is indicative of the number or size of data changes applied to the source database 116 that can be identified in a predefined time interval by a capturing process. For example, the capturing process may include monitoring a log 144 of the source database 116 to identify all INSERT, UPDATE or DELETE statements performed on the source database 116 and stored in said log 144 during a predefined time interval. For example, the unit of the capture velocity 148 may be the number of statements extracted from the log 144 per minute, or per second; said unit could also be specified in Kilobytes or Megabytes of data changes that were identified in, and extracted from, the log 144 per minute or second. The capturing process may capture each data value change individually or in a batch mode.

The apply velocity 150 is indicative of the number or size of captured and transferred data changes that can be applied to the target database 118 in the predefined time interval. Similar to capture velocity 148, the apply velocity 150 may be specified in statements executed on the target database 118 per time interval, the amount of data changes in Kilobytes, Megabytes, or Gigabytes applied on the target database 118, e.g. Megabytes/sec, Gigabytes/hour, etc.

The transfer velocity 128 is indicative of the number or size of captured data changes that can be transferred from the source database 116 to the target database 118 in a predefined time interval. Again, the value may be specified in transferred statements per minute or second, or in transferred Kilobytes, or Megabytes of data changes per second.

The factors F1 may be, for example, one or more of the following: the number and capacity of the CPUs and/or the size of the main memory used for capturing the data changes, e.g. by evaluating the log 144, and/or the speed of a non-volatile storage medium having stored the log 144 and/or the number of unprocessed log entries of log 144 which may specify unreplicated data changes. For example, the number of log entries not having been evaluated by the capture module 112 may indicate how far the capture process "is behind" the data changes which are continuously applied to the source database 116 in "normal operation mode". All factors F1 may depend on the load of the source DBMS 122 and the load of a respective source database server 108, and may also depend on the size and number of the write statements executed asynchronously to the capture process in the source database 116.

One or more of the factors F1 may also be indicative of the degree the capture process of a source database 116 is "behind" the number or amount of the data changes having already been applied to the source database 116. It may happen that many Gigabytes of changed data have already been applied to the source database 116, but have not yet been extracted from the log 144 because the processor 154 of the source database 116, responsible for performing the capture process, is currently busy performing other database queries dispatched for execution to the source database 116. Thus, one of the factors F1 may be the size of the source database log 144 that has not been processed to extract unreplicated data changes of the database.

The factors F2 may be, for example, one or more of the following: the stability and bandwidth of the network connection, or the bus system over which the changes are transferred; network delays caused by network errors or by the transfer of competing data packages; the number of network switches used for routing the data changes during their asynchronous replication to the target database 118 (the routing decision may cause delays, the more routers used, the higher the typical transfer velocity because the routing decisions may be parallelized); and/or the number and configuration of firewalls that have to be passed by the data changes during their asynchronous replication (a cascade of one or more firewalls may have to be passed by the replicated data packets being transferred from the source database 116 to the target database 118, each firewall may process and evaluate the data to avoid the spread of malicious content). The higher the number of firewalls to be passed and the more restrictive the configuration of said firewalls, the lower the transfer velocity.

The factors F3 may be, for example, one or more of the following: the number and capacity of the CPUs and/or the size of the main memory used for applying the transferred data changes on the target database 118, e.g. by performing statements on the target database 118. Again, this may depend on the load of the target DBMS and the load of a respective target database server 108. One or more of the factors F3 may also be indicative of the degree the apply process of a target database 118 is "behind" the availability of the transferred data at the target database 118. It may happen that many Gigabytes of data have already been transferred to the target database 118, but have been queued for the apply process in a waiting queue because the target database 118 is currently busy performing other database queries dispatched for execution to the target database 118. Thus, one of the factors of F3 may be the state of a waiting queue for applying data changes on the target database 118.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly including more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. The amount of processing resources may indicate the use degree of each of the physical components such as CPU, memory, and N/W bandwidth included in the computer system and their money cost. It is further under stood that, when not mutually exclusive, combinations of blocks in different flowcharts, illustrations, and/or block diagrams may be combined. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for dispatching a database request to either a source database or a target database,
wherein the source database is configured to efficiently process database queries of a first query type, wherein the target database is configured to efficiently process database queries of a second query type, wherein data changes in the source database are asynchronously replicated to the target database, and wherein all changed data in the source database impacting a result of the database request are replicated to the target database before executing the database request, the method comprising:
  receiving, by a computer, a database request to be executed on a source database or a target database;
  determining, by the computer, a latency time to asynchronously complete a replication from the source database to the target database of, at least, all unreplicated data changes that impact the result of the received database request;
  determining, by the computer, a velocity of replication to the target database, wherein the velocity of replication is one of:
    a capture velocity, the capture velocity being a number or size of data changes applied to the source database that can be identified in a predefined time interval;
    an apply velocity, the apply velocity being a number or size of identified data changes that can be applied to the target database in a predefined time interval;
    a function of the capture velocity;
    a function of the apply velocity; or
    a function of both the capture and the apply velocity;
  predicting, by the computer, using the determined latency time and determined velocity of replication, which of the source database or the target database will complete an execution of the received database request first, by:
    determining, by the computer, a transfer velocity, the transfer velocity being a number or size of identified data changes applied to the source database that can be transferred to the target database in a predefined time interval during an asynchronous replication to the target database;
    calculating, by the computer, a total target database time, starting at the receipt of the database request by the computer and ending at the completion of the execution of the received database request on the target database, according to the following formula:

$$CTD = EQ2 + \left(L * \frac{VT}{V} * C3\right) + CF,$$

wherein L is the determined latency time,
wherein VT is the determined transfer velocity,
wherein V is the determined velocity of replication,
wherein C3 is a correction constant,
wherein CTD is the total target database time,
wherein CF is a constant indicating invariable hardware, software and/or firmware-related delays, and
wherein EQ2 is an estimated time for executing the received database request on the target database; and
comparing, by the computer, the calculated total target database time with an estimated time for executing the received database request on the source database,
wherein a high latency time and a low velocity lowers a probability that the execution of the received database request will be finished first on the target database; and
responsive to predicting which of the source database or the target database will complete the execution of the database request first,
dispatching, by the computer, the database request to the source database or the target database predicted to complete the execution of the database request first.

2. The method according to claim 1, wherein determining, by the computer, the velocity of replication further comprises calculating, by the computer, the velocity of replication according to the following formula:

Vtotal=(minimum(Vcapture,Vapply)*C1+C2, wherein Vcapture is the capture velocity,
wherein Vapply is the apply velocity,
wherein Vtotal is the determined velocity of replication, and
wherein C1 and C2 are correction constants.

3. The method according to claim 1, further comprising:
receiving, by the computer, a first estimated time for executing the received database request on the source database;
receiving, by the computer, a second estimated time for executing the received database request on the target database; and
wherein predicting, by the computer, which of the source database or the target database will complete the execution of the received database request first further includes using the received first estimated time and second estimated time, wherein a long received first estimated time and a short received second estimated time increases the probability that the execution of the received database request will be finished first on the target database.

4. The method according to claim 3, further comprising:
normalizing, by the computer, the received first estimated time and the received second estimated time.

5. The method according to claim 3,
wherein receiving, by the computer, the second estimated time for executing the received database request on the target database further comprises receiving, by the computer, a version number of the target database associated with the second estimated time; and
wherein dispatching, by the computer, the database request to the target database, if the target database is predicted to complete the execution of the database request first, further comprises including, by the computer, the received version number of the target database with the dispatched database request.

6. The method according to claim 1, further comprising:
identifying, by the computer, the unreplicated data changes in the source database that impact the result of the received database request, the unreplicated data changes including:
data changes most recently committed in the source database by a transaction; and
data changes in the source database, made by a database operation in a same transaction as the received database request, wherein the database operation directly precedes the received database request and wherein the data changes are not committed.

7. The method according to claim 6, wherein identifying, by the computer, the unreplicated data changes in the source database that impact the result of the received database request further comprises evaluating a transaction log of the source database and extracting database operations that introduced the unreplicated data changes.

8. The method according to claim 1 wherein the target database is one of a plurality of target databases, the method further comprising:
requesting, by the computer, an estimated time for executing the received database request from each of the plurality of target databases;
receiving, by the computer, a plurality of estimated times from each of two or more of the plurality of target databases;
wherein determining, by the computer, the latency time further comprises determining, by the computer the latency time to asynchronously complete a replication from the source database to each of the two or more of the target databases;
wherein determining, by the computer, the velocity of replication further comprises determining, by the computer, the velocity of replication to each of the two or more target databases;
wherein calculating, by the computer, the total target database time further comprises calculating, by the computer, the total target database time for each of the two or more target databases;
wherein comparing, by the computer, the calculated total target database time further comprises comparing, by the computer, each of the two or more calculated total target database times with each other and with the estimated time for executing the received database request on the source database; and
wherein dispatching, by the computer, the database request is further responsive to the prediction of which of the source database or one of the two or more target databases will complete the execution of the database request first.

9. The method according to claim 1,
wherein a materialized query table of a database is the target database,
wherein another database table in a same database as the materialized query table that is a data source for the materialized query table is the source database,
wherein determining, by the computer, the latency time includes determining an expected time from a beginning of a first refresh of the materialized query table to an end of a succeeding, second refresh of the materialized query table, and
wherein determining, by the computer, the velocity of replication to the target database includes dividing the materialized query table data content size by a time required to both extract data from the other database table that is the data source and load the extracted data into memory structures that represent the materialized query table.

10. A computer system for dispatching a database request to either a source database or a target database, wherein the source database is configured to efficiently process database queries of a first query type, wherein the target database is configured to efficiently process database queries of a second query type, wherein data changes in the source database are asynchronously replicated to the target database, and wherein all changed data in the source database impacting a result of the database request are replicated to the target database before executing the database request, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
  program instructions to receive, by a computer, a database request to be executed on a source database or a target database;
  program instructions to determine, by the computer, a latency time to asynchronously complete a replication from the source database to the target database of, at least, all unreplicated data changes that impact the result of the received database request;
  program instructions to determine, by the computer, a velocity of replication to the target database, wherein the velocity of replication is one of:
    a capture velocity, the capture velocity being a number or size of data changes applied to the source database that can be identified in a predefined time interval;
    an apply velocity, the apply velocity being a number or size of identified data changes that can be applied to the target database in a predefined time interval;
    a function of the capture velocity;
    a function of the apply velocity; or
    a function of both the capture and the apply velocity;
  program instructions to predict, by the computer, using the determined latency time and determined velocity of replication, which of the source database or the target database will complete an execution of the received database request first, the program instructions to predict further comprising:
    program instructions to determine, by the computer, a transfer velocity, the transfer velocity being a number or size of identified data changes applied to the source database that can be transferred to the target database in a predefined time interval during an asynchronous replication to the target database;
    program instructions to calculate, by the computer, a total target database time, starting at the receipt of the database request by the computer and ending at the completion of the execution of the received database request on the target database, according to the following formula:

$$CTD = EQ2 + \left(L * \frac{VT}{V} * C3\right) + CF,$$

wherein L is the determined latency time,
    wherein VT is the determined transfer velocity,
    wherein V is the determined velocity of replication,
    wherein C3 is a correction constant,
    wherein CTD is the total target database time,
    wherein CF is a constant indicating invariable hardware, software and/or firmware-related delays, and
    wherein EQ2 is an estimated time for executing the received database request on the target database; and
  program instructions to compare, by the computer, the calculated total target database time with an estimated time for executing the received database request on the source database,
    wherein a high latency time and a low velocity lowers a probability that the execution of the received database request will be finished first on the target database; and
  responsive to predicting which of the source database or the target database will complete the execution of the database request first,
    program instructions to dispatch, by the computer, the database request to the source database or the target database predicted to complete the execution of the database request first.

11. The computer system according to claim 10, wherein program instructions to determine, by the computer, the velocity of replication further comprises program instructions to calculate, by the computer, the velocity of replication according to the following formula:

$$V\text{total} = (\text{minimum}(V\text{capture}, V\text{apply})) * C1 + C2,$$

wherein Vcapture is the capture velocity,
  wherein Vapply is the apply velocity,
  wherein Vtotal is the determined velocity of replication, and
  wherein C1 and C2 are correction constants.

12. The computer system according to claim 10, further comprising:
  program instructions to receive, by the computer, a first estimated time for executing the received database request on the source database;
  program instructions to receive, by the computer, a second estimated time for executing the received database request on the target database; and
  wherein program instructions to predict, by the computer, which of the source database or the target database will complete the execution of the received database request first further includes using the received first estimated time and second estimated time, wherein a long received first estimated time and a short received second estimated time increases the probability that the execution of the received database request will be finished first on the target database.

13. The computer system according to claim 12, further comprising:
  program instructions to normalize, by the computer, the received first estimated time and the received second estimated time.

14. The computer system according to claim 12,
  wherein program instructions to receive, by the computer, the second estimated time for executing the received database request on the target database further comprises program instructions to receive, by the computer, a version number of the target database associated with the second estimated time; and wherein program instructions to dispatch, by the computer, the database request to the target database, if the target database is predicted to complete the execution of the database request first, further comprises program instructions to include, by the computer, the received version number of the target database with the dispatched database request.

15. The computer system according to claim 10, further comprising:
program instructions to identify, by the computer, the unreplicated data changes in the source database that impact the result of the received database request, the unreplicated data changes including:
data changes most recently committed in the source database by a transaction; and
data changes in the source database, made by a database operation in a same transaction as the received database request, wherein the database operation directly precedes the received database request and wherein the data changes are not committed.

16. The computer system according to claim 15, wherein program instructions to identify, by the computer, the unreplicated data changes in the source database that impact the result of the received database request further comprises program instructions to evaluate a transaction log of the source database and extract database operations that introduced the unreplicated data changes.

17. The computer system according to claim 10 wherein the target database is one of a plurality of target databases, the program instructions further comprising:
program instructions to request, by the computer, an estimated time for executing the received database request from each of the plurality of target databases;
program instructions to receive, by the computer, a plurality of estimated times from each of two or more of the plurality of target databases;
wherein program instructions to determine, by the computer, the latency time further comprise program instructions to determine, by the computer the latency time to asynchronously complete a replication from the source database to each of the two or more of the target databases;
wherein program instructions to determine, by the computer, the velocity of replication further comprise program instructions to determine, by the computer, the velocity of replication to each of the two or more target databases;
wherein program instructions to calculate, by the computer, the total target database time further comprise program instructions to calculate, by the computer, the total target database time for each of the two or more target databases;
wherein program instructions to compare, by the computer, the calculated total target database time further comprise program instructions to compare, by the computer, each of the two or more calculated total target database times with each other and with the estimated time for executing the received database request on the source database; and
wherein program instructions to dispatch, by the computer, the database request is further responsive to the prediction of which of the source database or one of the two or more target databases will complete the execution of the database request first.

18. The computer system according to claim 10,
wherein a materialized query table of a database is the target database,
wherein another database table in a same database as the materialized query table that is a data source for the materialized query table is the source database,
wherein program instructions to determine, by the computer, the latency time includes program instructions to determine an expected time from a beginning of a first refresh of the materialized query table to an end of a succeeding, second refresh of the materialized query table, and
wherein program instructions to determine, by the computer, the velocity of replication to the target database includes program instructions to divide the materialized query table data content size by a time required to both extract data from the other database table that is the data source and load the extracted data into memory structures that represent the materialized query table.

* * * * *